United States Patent [19]

Alten

[11] Patent Number: 5,047,688
[45] Date of Patent: Sep. 10, 1991

[54] AUTOMOBILE INTERIOR LIGHT CONTROL SYSTEM

[75] Inventor: Ralph W. Alten, Arnold, Mo.

[73] Assignee: Siegel-Robert, Inc., St. Louis, Mo.

[21] Appl. No.: 536,308

[22] Filed: Jun. 11, 1990

[51] Int. Cl.$^5$ ............................................. B60Q 1/00
[52] U.S. Cl. .................................... 315/84; 315/360; 307/10.5
[58] Field of Search .................. 315/77, 84, 307, 360; 307/10.5

[56] References Cited

U.S. PATENT DOCUMENTS 4,473,871  9/1984  Fuchshuber ...................... 315/84 X

OTHER PUBLICATIONS

1989 Ford Probe Catalog, p. 26.

Primary Examiner—Robert J. Pascal
Attorney, Agent, or Firm—Armstrong, Teasdale, Schlafly & Davis

[57] ABSTRACT

An improved interior lighting system for use in an automobile incorporates a traditional manual switch and door switch for turning the interior light of the automobile on and off, and provides circuitry for causing the interior light to rise transiently to a maximum level when activated to turn on and for causing the interior light to decay transiently to a minimum level when activated to turn off. Circuitry is also provided to automatically turn off the interior light after a predetermined time lapses from the interior light being manually activated by the manual switch, when the ignition to the automobile is turned off. The lighting system also includes circuitry to cause the interior light to remain on for a predetermined time after the door of the automobile is opened, and circuitry to override the predetermined time delay when the ignition of the automobile is turned on.

50 Claims, 1 Drawing Sheet

AUTOMOBILE INTERIOR LIGHT CONTROL SYSTEM

REFERENCE TO DISCLOSURE DOCUMENT

Disclosure Document No. 233,608 filed in the U.S. Patent and Trademark Office on Aug. 21, 1989, In Re Siegel-Robert, Inc., and Ralph Alten, pertains to this application and said Disclosure Document is incorporated by reference herein.

BACKGROUND AND SUMMARY OF THE INVENTION

Electrically controlled interior lights are an accessory found on automobiles. In a typical arrangement, the lights are mounted in the ceiling of the automobile, on the side panel of the door, or in various other interior places where lighting is beneficial. The interior lights incorporated in automobiles of the present and past are controlled by electro-mechanical switches. For instance, most automobiles provide circuitry to automatically turn on an interior light of the automobile when the door of the automobile is opened and to automatically turn off the interior light when the automobile door is closed. Additionally, most vehicles are equipped with a switch which allows the operator of the vehicle to manually turn the interior light between an "on" and an "off" position.

However, there are problems associated with the interior lighting control systems of the prior art. Often the operator of the automobile opens the door, sits down in the automobile, and then shuts the car door. When the door is closed, the interior light automatically, and virtually instantaneously, shuts off. The operator of the vehicle is thereby surrounded by darkness. Quite often, the operator of the vehicle needs the illumination of the interior light to perform some function, such as finding the keys of the car, before driving the car. While most automobiles are equipped with switches which allow the operator to manually turn the interior light on, such a switch requires the operator to fumble around in the darkness in an effort to find and activate the switch.

Another problem associated with the prior art concerns an inadvertent mistake by the driver in deactivating the interior light after it has been activated with the manual switch. The problem arises when a vehicle operator turns on the interior light with the manual switch, forgets to turn off the interior light after using it, and then turns off the engine and leaves the vehicle. In such a scenario, the interior light remains on, thus depleting the car battery voltage level.

Yet another problem associated with the prior art interior lighting systems concerns their virtually instantaneous on or off condition. That is, when circuitry is activated to turn on or off the interior light of the automobile, the light level of the interior light reaches a maximum or minimum level almost instantaneously. An instantaneous on or off interior lighting system prevents the operator's eyes from adjusting gradually to the new lighting condition. While the instantaneous switching may only cause the operator discomfort under some circumstances, the instantaneous switching may have a temporary blinding effect upon the operator which could prove hazardous if it occurs while the operator is driving the vehicle.

To solve these and other problems, the inventor herein has succeeded in developing an improved interior lighting system for automobiles. The invention includes a manual switch which allows the operator of the automobile to switch the interior lights between an on or an off position. The invention provides circuitry to automatically turn off the interior light after approximately five minutes have lapsed from the time that the interior light was activated with the manual switch, if the automobile ignition switch is in the "off" position. The invention provides circuitry to prevent the automatic turn off when the ignition switch is in the "on" position. This prevents the annoyance of having to turn the lights back on after 5 minutes have lapsed. For example, this situation might arise when a passenger is reading a map while the automobile is being driven.

The invention also provides a door switch which automatically turns on the interior light of the automobile when a door of the automobile is opened, and incorporates circuitry which automatically generates an electrical signal to turn off the interior light a preselected time, such as thirty seconds, after the door of the automobile is closed. This invention also includes a circuit which causes the thirty second delay to be cancelled when the ignition switch is turned on.

Finally, this invention provides a delay circuit which is electrically connected between the manual and the door switch and the interior light. Any electrical signal generated by the door switch or the manual switch to turn on or off the interior light of the automobile are received by the delay circuit. The delay circuit causes the light level of the interior light to rise transiently to a maximum level in response to an electrical signal to turn on the interior light, and causes the light level of the interior light to decay transiently to a minimum level in response to an electrical signal to turn off the interior light.

The following sets forth objects of one or more of the claims for the invention. It is an object to provide a lighting system with a delay which causes the interior light of an automobile to rise slowly to a maximum when the light is turned on and to decay slowly when the light is turned off. Another object is to provide a lighting system which gradually switches between an on and an off illumination level for an interior light to prevent operator discomfort and momentary blinding.

It is further an object to provide means to generate electrical signals for turning the interior light of the automobile on and off. It is an object to have a manual generating means that allows the operator of the automobile to a manually activate a momentary switch between an on and off position, and further, to have a shut-off means that automatically shuts off the interior light after a period of time elapses from the light being activated manually so that battery rundown is prevented. It is also an object to provide circuitry to override the automatic shut off circuitry when the ignition is turned on.

Another object is to provide a door switch means which automatically turns on the interior light of the automobile when the door of the automobile is opened, and which allows a predetermined time to lapse after the door is closed before the interior light is automatically turned off. Moreover, an object is to provide an ignition means to override the predetermined time delay when the ignition is turned on.

BRIEF DESCRIPTION OF THE DRAWINGS

The above objects, advantages and capabilities of the present invention will become apparent upon consideration of the following detailed description of the preferred embodiments thereof, especially when taken in conjunction with the accompanying drawings, wherein.

DETAILED DESCRIPTION OF A PREFERRED EMBODIMENT OF THE INVENTION

Figure 2:
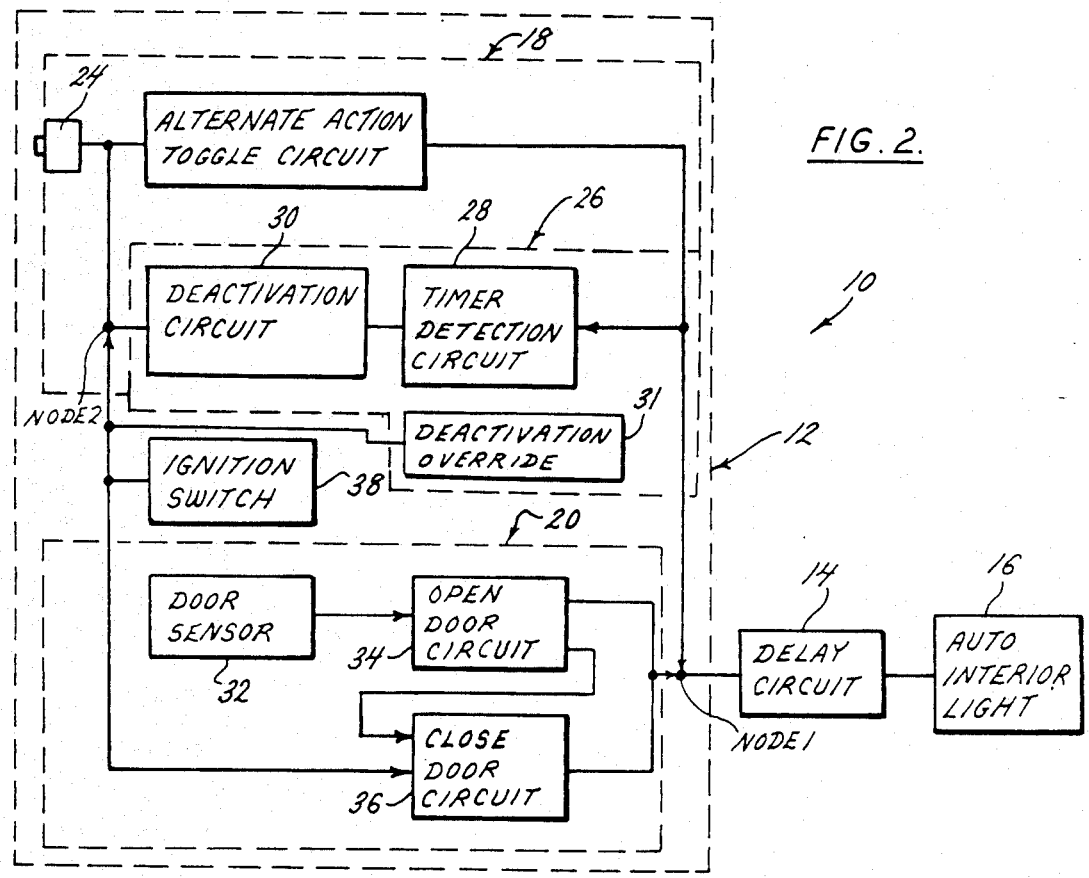
FIG. 2 is a block diagram of the circuitry used to implement the interior light system.
Figure 1:
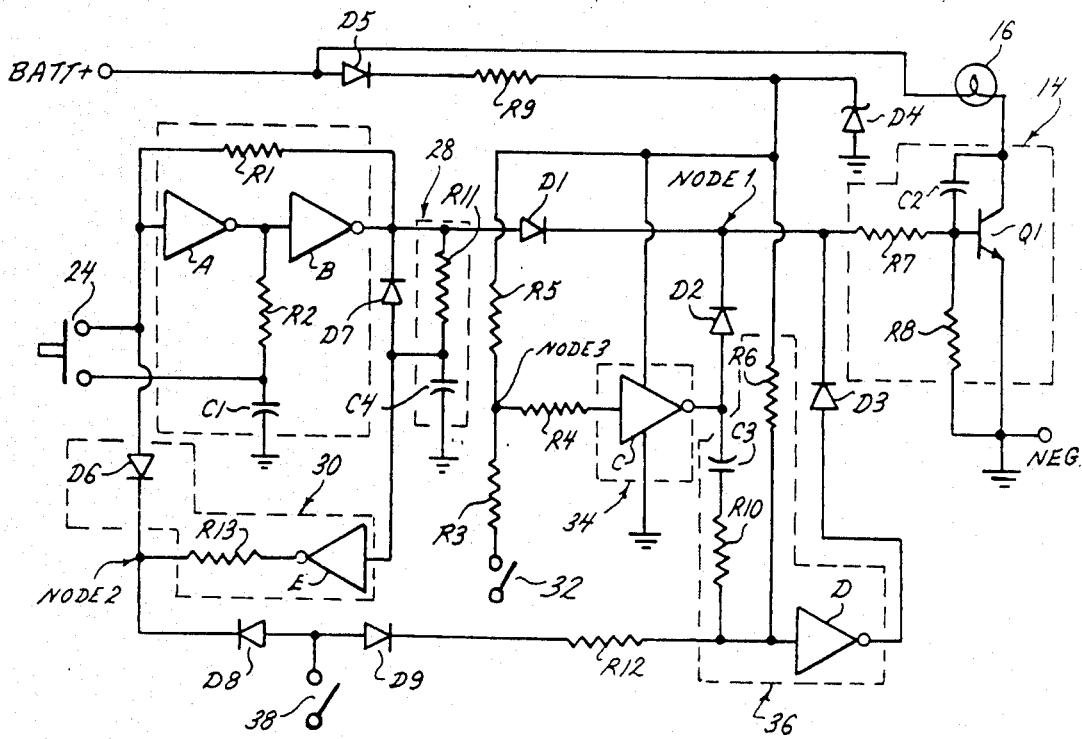
FIG. 1 is a schematic diagram of the circuitry used to implement the interior light system.

Referring to FIG. 1 and FIG. 2 of the drawings, the control circuit 10 of an interior light of an automobile constructed in accordance with the present invention comprises, in its most basic form, a signal generating circuit 12, a delay circuit 14 electrically connected to the signal generating circuit 12, and an automobile interior light 16 electrically connected to the delay circuit 14.

The signal generating circuit 12 is comprised of two distinct circuits: a manual generating circuit 18 and a door switch 20. The manual generating circuit 18 allows the operator of the automobile to manually turn on an interior light of the automobile between an "on" and an "off" position by operating the momentary switch 24. The manual generating circuit 18 acts as an alternate action toggle circuit and comprises inverters A and B, resistor R1, resistor R2, and capacitor C1, and also a shut-off circuit 26 discussed below. When the automobile operator activates the momentary switch 24 to turn on the interior light 16, a positive voltage is created at node 1, the positive voltage typically being that of the positive battery charge. When the operator activates the push button switch 24 to turn off the interior light 16, a negative battery voltage is produced at node 1, the voltage typically being 0 volts.

The shut-off circuit 26 will automatically turn off the interior light 16 after a predetermined time lapses from the light being turned on by the momentary switch 24. The shut-off circuit 26 operates only when the ignition is turned off. The shut-off circuit 26 comprises a timer detection circuit 28, a deactivation circuit 30, and a deactivation override circuit 31. The timer detection circuit 28 determines when the manual generating circuit 18 has been activated by the operator to turn on the interior light 16, and also generates an electrical signal when a predetermined time lapses after the momentary switch 24 has been activated to turn on light 16. The timer detection circuit 28 comprises capacitor C4 and resistor R11. The deactivation circuit 30 is electrically connected to the timer detection circuit 28. The deactivation circuit 30 is responsive to the electrical signal generated by the timer detection circuit 28 which indicates that a predetermined time has lapsed from activation of the momentary switch 24 to turn on light 16. The deactivation circuit 30 comprises an inverter E and resistor R13. When the ignition is turned on, the battery positive voltage is at node 2. Resistor R13 is implemented as a current limiter for the output of inverter E when the ignition is turned on.

In operation, the push button switch 24 is activated to produce a battery positive voltage at the output of inverter B, thereby causing the interior light 16 to be turned on. Under this condition, capacitor C4 begins to charge through the resistor R11. When capacitor C4 is charged to approximately one-half of the battery positive voltage, the output of inverter E goes low which causes the input of inverter A to go low. When the input to inverter A goes low, the output to inverter B is also forced to go low which thereby turns off the interior light 16. The time lapse between the activation of the push button switch 24 to turn on the light 16 and the automatic shut-off of the light 16 accomplished by the shut-off circuit 26 is controlled by the time constant of the capacitor C4 and the resistor R11. In this illustration, the time constant is set for approximately 5 minutes, a time period sufficient to prevent accidental battery rundown.

The deactivation override circuit 31 is electrically connected to the output of the deactivation circuit 30 (comprised of inverter E and Resistor R13) at node 2. When the ignition is turned on, the override circuit 31 generates an electrical signal which cancels the automatic shut-off which occurs after 5 minutes have lapsed from the interior lights being manually activated with the momentary switch 24. This feature is accomplished by tying node 2 to the battery positive voltage through the ignition switch and diode D8. Thus, when the voltage at node 2 goes low, which occurs when the deactivation circuit 30 generates an electrical signal to automatically turn off the interior lights, the input of inverter A is not pulled low because the battery positive voltage is tied to node 2 when the ignition is turned on. The deactivation override circuit also comprises diode D6 which allows the input of inverter A to go low when the momentary switch 24 is activated to manually turn off the interior lights, when the ignition is turned on.

As noted, the generating circuit 12 also comprises a door switch 20 which controls the operation of the interior light 16 when a door of the automobile is opened or closed. The door switch 20 comprises a door sensor 32, an open door circuit 34, a closed door circuit 36 and an ignition switch 38. The door sensor 32 of the door switch 20 causes node 3 to be grounded when the automobile door is opened, and produces a battery positive voltage at node 3 when that door is closed. The open door circuit 34 comprises an inverter C. When the door is opened, the output of the inverter C is at a positive battery voltage. Thus, the voltage at node 1 is at a positive battery voltage which causes the interior light 16 to turn on. The closed door circuit 36 is configured as an astable multivibrator which comprises inverter D, capacitor C3, and resistors, R6 and R10. When the door is opened, the open door circuit 34 generates an electrical signal which causes the light 16 to automatically turn on. When the door is closed, the closed door circuit 36 generates an electrical signal which causes the interior light 16 to automatically shut-off after a predetermined time lapses after the door has been closed. After the door is closed, the predetermined time before the interior light will automatically be shut-off is determined by the time constant of the resistive-capacitative network comprising capacitor C3 and resistord R6 and R10. In the embodiment illustrated, the time constant is set for approximately 30 seconds. Thus, following the closing of the door, the closed door circuit 36 will maintain positive battery voltage at node 1 for approximately 30 seconds. During such time, the interior light of the automobile will remain on.

The ignition switch 38 is electrically connected with the input of the closed door circuit 36. The ignition switch 38 generates an electrical signal which cancels the 30 second delay following the closing of the door, when the automobile ignition is turned on. This feature is accomplished by tying the input of the inverter D to the battery positive voltage through resistor R12 and diode D9. When the ignition is turned on, the output of inverter D, and thus the voltage at node 1, is forced to a battery low voltage (0 volts) which causes the interior light 16 to shut off.

The delay circuit 14 of the control circuit 10 causes the light level of the light 16 to rise transiently to a maximum level in response to an electrical signal to turn on the light 16 from either the manual generating circuit 18 or the door switch 20. The delay circuit 14 further causes the light level of light 16 to decay transiently to a minimal level in response to an electrical signal to turn off the light 16 from the manual generating circuit 18 or the door switch 20. The delay circuit 14 is connected to the manual generating circuit 18 and the door switch 20 at node 1.

The delay circuit 14 comprises a power Darlington transistor (or power mosfet), Q1, which is wired as an integrator circuit in conjunction with capacitor C2, resistor R7 and resistor R8. Resistor R7 affects the rise time and resistor R8 affects the fall time. Any DC voltage appearing at node 1 is integrated to cause the current through the interior light 6 to rise or fall slowly.

The diodes D4 and D5, and resistor R9 protect the oirouit from transients, over voltage, or reverse polarity. The resistors R3 and R5 form a network to provide a battery positive voltage at the input of inverter C when the door of the automobile is closed. Diodes D1, D2, D3, and D7 are used to isolate the various circuit switches from one another. Likewise, diodes D8 and D9 isolate node 2 from the input of inverter D to prevent interaction.

In the circuit 10 illustrated, the electrical components have the following values or type numbers:

R1 = 100K ohms
R2 = 1M ohms
R3 = 3.3K ohms
R4 = 1M ohms
R5 = 10K ohms
R6 = 1.5M ohms
R7 = 15K ohms
R8 = 10K ohms
R9 = 560 ohms
R10 = 10K ohms
R11 = 4.7M ohms
R12 = 68K ohms
C1 = 0.1 uf
C2 = 100 uf
C3 = 22 uf
C4 = 100 uf
D1 = 1N4148
D2 = 1N4148
D3 = 1N4148
D4 = 1N5245
D5 = 1N4004
D6 = 1N4148
D7 = 1N4148
D8 = 1N4148
D9 = 1N4148
Inverter A = 4069B
Inverter B = 4069B
Inverter C = 4069B
Inverter D = 4069B
Inverter E = 4069B
Q1 = TIP110

What is claimed:

1. A lighting system for controlling an interior electrical light of an automobile, comprising:
   a generating means for generating an electrical signal for turning on or off the automobile interior light; and,
   a delay means electrically connected to said interior light and responsive to said generating means, so that the light level of the interior light rises transiently to a maximum level when said generating means is activated to create an electrical signal to turn on the interior light, and so that the light level of the interior light decays transiently to a minimum light level when said generating means is activated to create an electrical signal to turn off the interior light.

2. The lighting system of claim 1 wherein said delay means comprises an integration circuit.

3. The lighting system of claim 2 wherein said integration circuit comprises a transistor electrically connected to a resistive-capacitative network.

4. The lighting system of claim 3 wherein said transistor is a Darlington transistor.

5. The lighting system of claim 1 wherein said generating means comprises a means for manually generating an electrical signal for turning on or off the interior light of the automobile.

6. The lighting system of claim 5 wherein said manual generating means comprises a momentary switch, which is mounted on the interior of the automobile.

7. The lighting system of claim 5 wherein said manual generating means includes a shut-off means for automatically turning off said interior light of the automobile after a predetermined time lapses from said light being turned on by said manual generating means.

8. The lighting system of claim 7 wherein said shut-off means comprises a timer detection means for determining when said manual generating means has been activated to turn on said interior light and for producing an electrical signal when a predetermined time lapses after said manual generating means has been activated to turn on said interior light, and a deactivation means responsive to said time detection means, for automatically turning off said interior light when said time detection means indicates that a predetermined amount of time has lapsed from said light being turned on by said manual generating means.

9. The lighting system of claim 8 wherein said timer detection means comprise a capacitative-resistive network electrically connected to said manual generating means.

10. The lighting system of claim 8 wherein said deactivation means is electrically connected between said timer detection means and said manual generating means, said deactivation means being responsive to said timer detection means such that an electrical signal from said time detection means will cause said deactivation means to automatically turn off the interior light of the automobile.

11. The lighting system of claim 8 wherein the deactivation means comprises an inverter.

12. The lighting system of claim 8 wherein said shut-off means further comprises a deactivation override means for preventing the deactivation means from automatically turning off said interior lights when the ignition of said automobile is turned on.

13. The lighting system of claim 12 wherein said deactivation override means comprises an isolation means such that the output of said deactivation means is electrically connected through said isolation means and the ignition switch of said automobile to the battery positive voltage of said automobile.

14. The lighting system of claim 13 wherein said isolation means is a diode.

15. The lighting system of claim 5 wherein said generating means further comprises a door switch means, said door switch means comprising a door sensor means for detecting when the door of the automobile is opened or closed, an open door means for generating an electrical signal to automatically turn on the interior lights of the automobile when a door of said automobile is opened, and a closed door means for generating an electrical signal to automatically turn off the interior light after a predetermined time lapses from the door of the automobile being closed.

16. The lighting system of claim 15 wherein said open door means comprises an inverter circuit, and said door sensor means comprises a switch which grounds the input to said inverter circuit, causing the output of said inverter circuit to go high, and thus causing said interior light of the automobile to illuminate.

17. The lighting system of claim 15 wherein said closed door means comprises an astable multivibrator circuit electrically connected to said door sensor means, said multivibrator circuit comprising an inverter and a capacitative-resistive network connected to the input of the inverter, so that when the automobile door is opened, said door means grounds said capacitative-resistive network, and when said door of the automobile is thereafter closed, the door sensor means causes a voltage value to be placed across the capacitative resistive network so that the output of the inverter remains high until a capacitor of the capacitative-resistive network charges to a voltage level sufficient so that the output of the inverter is inverted, and the interior light is turned off.

18. A lighting system for controlling an interior electrical light of an automobile, comprising:
a means for manually generating an electrical signal for turning on or off the interior light of the automobile; and,
a delay means electrically connected to said interior light and responsive to the electrical signal of said manual generating means, so that the light level of the interior light rises transiently to a maximum level when said manual generating means is activated to create an electrical signal to turn on the interior light, and so that the light level of the interior light decays transiently to a minimum light level when said manual generating means is activated to create an electrical signal to turn off the interior light.

19. The lighting system of claim 18 wherein said manual generating means comprises a push button momentary switch which is mounted on the interior of the automobile and allows a passenger of the automobile to switch the interior light of the automobile between an on and an off position.

20. The lighting system of claim 18 wherein said manual generating means includes a shut-off means for automatically turning off said interior light of the automobile after a predetermined time lapses from said light being turned on by said manual generating means.

21. The lighting system of claim 20 wherein said shut-off means comprises a timer detection means for determining when said manual generating means has been activated to turn on the interior light of the automobile and for producing an electrical signal when a predetermined time lapses after said manual generating means has been activated to turn on said interior light, and a deactivation means responsive to said timer detection means for automatically turning off said interior light when the predetermined time lapses after the interior light has been turned on.

22. The lighting system of claim 21 wherein said timer detection means comprises a capacitative-resistive network electrically connected to said manual generating means.

23. The lighting system of claim 21 wherein said deactivation means comprises an inverting means electrically connected between said timer detection means and said manual generating means, responsive to said timer detection means so that an electrical signal from said timer detection means will cause said deactivation means to generate an electrical signal to automatically turn off the interior light of the automobile.

24. The lighting system of claim 20 wherein said predetermined time is approximately five minutes.

25. The lighting system of claim 21 wherein said shut-off means further comprises a deactivation override means for preventing the deactivation means from automatically turning off said interior lights when the ignition of said automobile is turned on.

26. The lighting system of claim 25 wherein said deactivation override means comprises an isolation means such that the output of said deactivation means is electrically connected through said isolation means and the ignition switch of said automobile to the battery positive voltage of said automobile.

27. The lighting system of claim 26 wherein said isolation means is a diode.

28. The lighting system of claim 18 wherein said delay means comprises an integration circuit.

29. The lighting system of claim 28 wherein said integration circuit comprises a transistor oirouit electrically connected to a resistive-capacitative network.

30. The lighting system of claim 29 wherein said transistor is a Darlington transistor.

31. A lighting system for controlling an interior electrical light of an automobile, comprising:
a door switch means comprising a door sensor means for detecting when the door of the automobile is opened or closed, an open door means for generating an electrical signal to automatically turn on the interior lights of the automobile when a door of said automobile is opened, and a closed door means for generating an electrical to automatically turn off the interior light after a predetermined time lapses from said door of the automobile being opened; and,
a delay means electrically connected to said interior light and responsive to said door switch means, so that the light level of the interior light rises transiently to a maximum level when said open door means is activated to create an electrical signal to turn on the interior light, and so that the light level of the interior light decays transiently to a minimum light level when said close door means generates an electrical signal to turn off the interior light.

32. The lighting system of claim 31 wherein said open door means comprises an inverter circuit and said door sensor means comprises a switch which grounds the input to the inverter circuit so that the output of said inverter goes high and so that said interior light of the automobile is illuminated.

33. The lighting system of claim 31 wherein said closed door means comprises an astable multivibrator circuit electrically connected to said door sensor means, said multivibrator circuit comprising an inverter and a capacitative-resistive network connected to the input of the inverter, so that when the door of the automobile is opened and door sensor means grounds said capacitative-resistive network, and when the door of the automobile is thereafter closed the door sensor means causes a voltage value to be placed across the capacitative-resistive network so that the output of the inverter remains high until a capacitor of the capacitative-resistive network charges to a voltage level sufficient so that the output of the inverter is inverted.

34. The lighting system of claim 31 wherein said predetermined time is approximately thirty seconds.

35. The lighting system of claim 31 wherein said door switch means further comprises an ignition means electronically connected to said closed door means, for automatically turning off the interior light of the automobile when the ignition of the automobile is turned on before said predetermined time lapses.

36. The lighting system of claim 31 wherein said delay means comprises an integration circuit.

37. The lighting system of claim 36 wherein said integration circuit comprises a transistor circuit electrically connected to a resistive-capacitive network.

38. The lighting system of claim 37 wherein said transistor is a Darlington transistor.

39. A lighting system for controlling interior lighting of an automobile, comprising:
a means for manually generating an electrical signal for turning on or off the interior light of the automobile, said manual generating means including a shut-off means for automatically turning off said interior light after a predetermined time lapses from said light being turned on by said manual generating means, said shut-off means comprising a timer detection means for determining when said manual generating means has been activated to turn on said interior light and for generating an electrical signal when a predetermined time lapses after said manual generating means has been activated to turn on said interior light, and a deactivation means responsive to said timer detection means, for automatically turning off said interior light when said timer detection means indicates that a predetermined time has lapsed from said light being turned on by said manual generating means;
a door switch means comprising a door sensor means for detecting when the door of the automobile is opened or closed, an open door means for generating an electrical signal to automatically turn on the interior light of the automobile when a door of said automobile is opened, and a closed door means for generating an electrical signal to automatically turn off the interior light after a predetermined time lapses from the automobile door being opened, said closed door means further including an ignition means for automatically turning off the interior light before the predetermined time lapses when the ignition is turned on;
a delay means electrically connected to said manual generating means and said door switch means, so that in response to an electrical signal the interior light is turned on from either said manual generating means or said door switch means, and so that the light level of the interior light decays transiently to a minimum level in response to an electrical signal to turn off the interior light from said manual generating means or said door switch means; and,
an interior light electrically connected to said decay means.

40. The lighting system of claim 39 wherein said delay means comprises an integration circuit.

41. The lighting system of claim 40 wherein said integration circuit comprises a transistor circuit electrically connected to a resistive-capacitive network.

42. The lighting system of claim 41 wherein said transistor is a Darlington transistor.

43. The lighting system of claim 39 wherein said manual generating means comprises a push button momentary switch which is mounted on the interior of the automobile.

44. The lighting system of claim 39 wherein said timer detection means comprises a capacitative-resistive network electrically connected to said manual generating means.

45. The lighting system of claim 39 wherein said deactivation means comprises an inverting means electrically connected between said timer detection means and said manual generating means, responsive to said timer detection means so that an electrical signal from said timer detection means will cause said deactivation means to generate an electrical signal to automatically turn off the interior light of the automobile.

46. The lighting system of claim 39 wherein said shut-off means further comprises a deactivation override means for preventing the deactivation means from automatically turning off said interior lights when the ignition of said automobile is turned on.

47. The lighting system of claim 46 wherein said deactivation override means comprises an isolation means such that the output of said deactivation means is electrically connected through said isolation means and the ignition switch of said automobile to the battery positive voltage of said automobile.

48. The lighting system of claim 47 wherein said isolation means is a diode.

49. The lighting system of claim 39 wherein said open door means comprises an inverter circuit and said door sensor means comprises a switch which grounds the input to the inverter circuit so that the output of said inverter circuit goes high and said interior light of the automobile is illuminated.

50. The lighting system of claim 39 wherein said closed door means comprises an astable multivibrator circuit electronically connected to said door sensor means, comprising an inverter and a capacitative-resistive network connected to the input of the inverter, such that when said door of the automobile is opened, said door sensor means grounds said capacitative-resistive network and when said door of the automobile is thereafter closed, the door sensor means causes a high voltage to be placed across the capacitative-resistive network, so that the output of the inverter to remain high until a capacitor of the capacitative-resistive network charges to a voltage level sufficient to cause the output of the inverter to invert.

* * * * *